J. B. FOOTE.
VARIABLE SPEED TRANSMISSION GEARING.
APPLICATION FILED JULY 16, 1917.
1,382,278. Patented June 21, 1921.
3 SHEETS—SHEET 1.
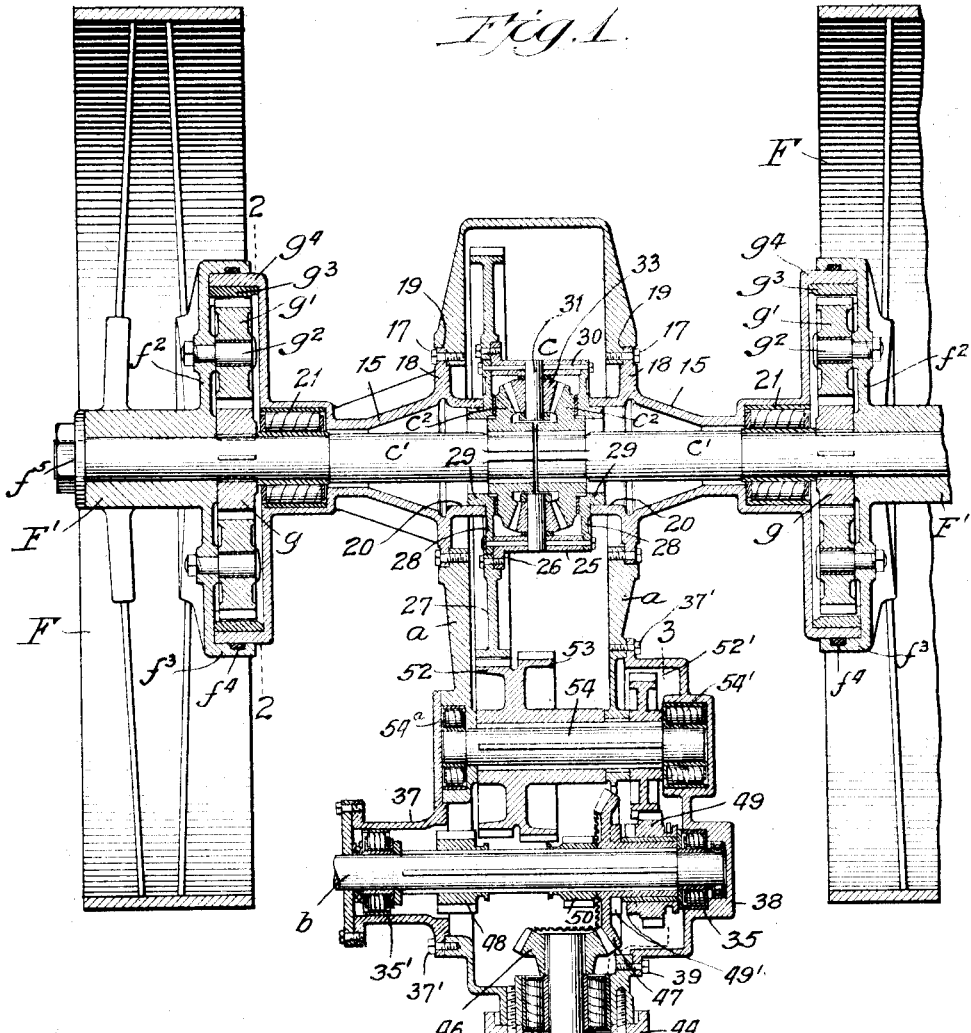

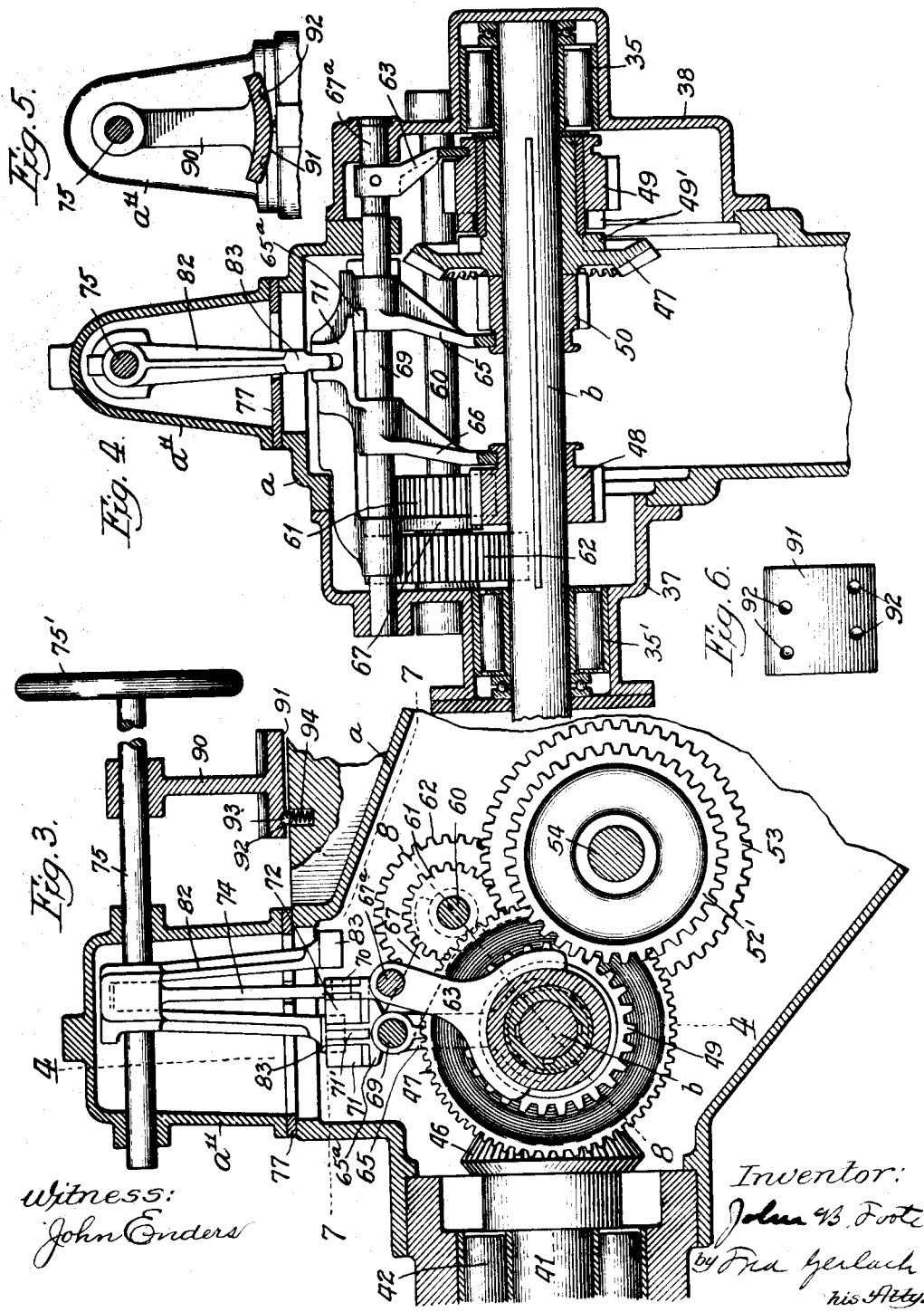

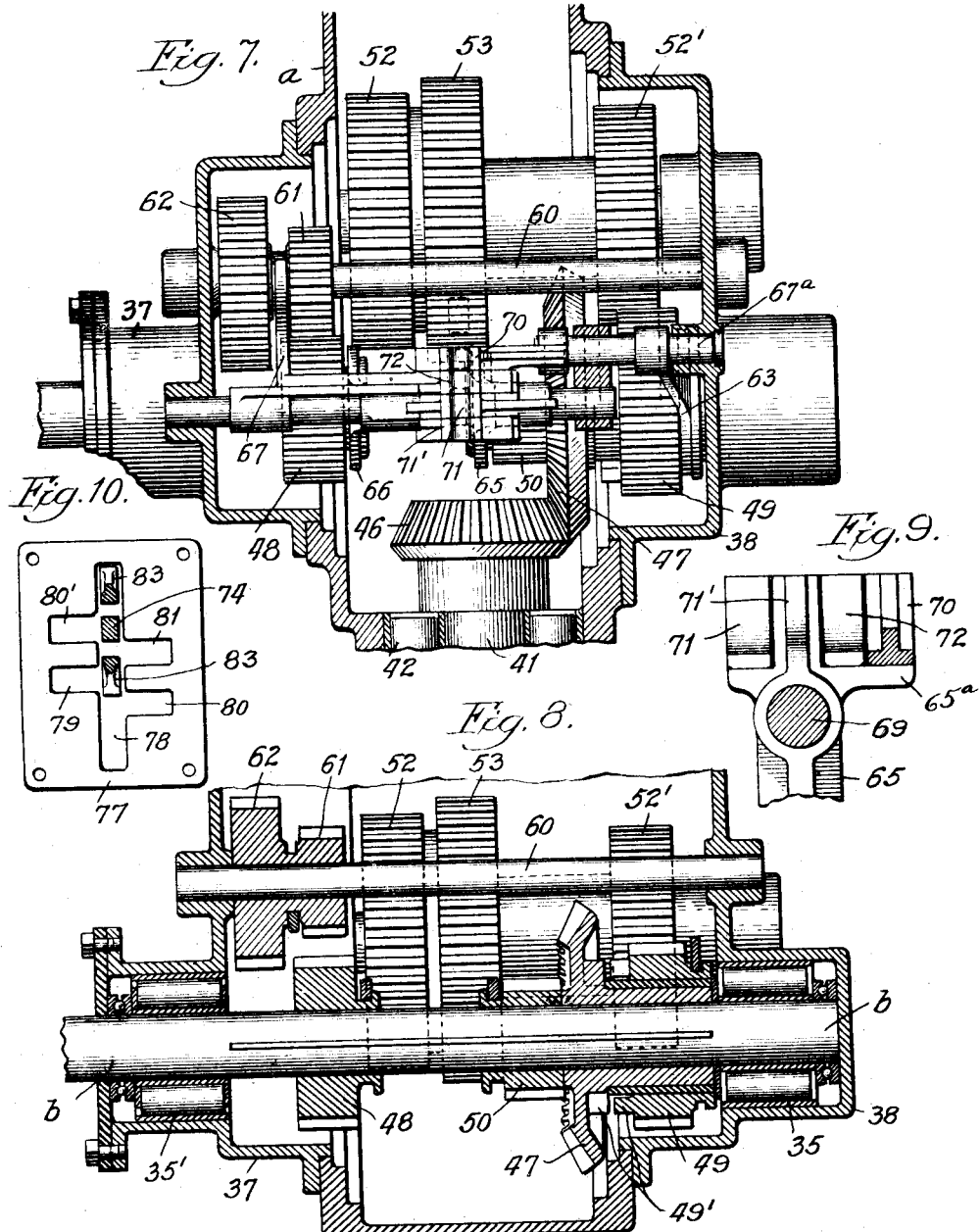

UNITED STATES PATENT OFFICE.

JOHN B. FOOTE, OF OAK PARK, ILLINOIS.

VARIABLE-SPEED-TRANSMISSION GEARING.

1,382,278.     Specification of Letters Patent.     Patented June 21, 1921.

Application filed July 16, 1917. Serial No. 180,750.

*To all whom it may concern:*

Be it known that I, JOHN B. FOOTE, a citizen of the United States, and a resident of Oak Park, in the county of Cook and State of Illinois, have invented certain new and useful Improvements in Variable-Speed-Transmission Gearing, of which the following is a full, clear, and exact description.

The invention relates to variable speed transmission gearing for tractors.

The object of the invention is to provide improved transmission gearing which is inclosed and adapted to drive the differential gearing through which the traction wheels are driven.

Other objects of the invention will appear from the following description.

The invention consists in the several novel features hereinafter set forth and more particularly defined by claims at the conclusion hereof.

In the drawings: Figure 1 is a horizontal section illustrating the invention applied to a tractor. Fig. 2 is a section taken on line 2—2 of Fig. 1. Fig. 3 is a vertical longitudinal section taken on line 3—3 of Fig. 1. Fig. 4 is a section taken on line 4—4 of Fig. 3. Fig. 5 is a detail of the holding device for the controller shaft. Fig. 6 is an inverted plan of the rocker arm of said device. Fig. 7 is a section taken on line 7—7 of Fig. 3. Fig. 8 is a section taken on line 8—8 of Fig. 3. Fig. 9 is a detail of the controller arms for the gears. Fig. 10 is a detail plan of the locking-plate for the controller arms.

The variable speed and differential gearing for driving a pair of co-axial traction wheels F is all inclosed in a case or housing $a$, which is preferably adapted to contain lubricant for the moving parts. A transverse drive shaft $b$ is mounted in and near one end of the case and the differential gearing $c$ is mounted in and near the other end. The end of the case $a$ containing the differential gearing, is supported by sleeves 15 which are secured to the sides of said case by bolts 17 passing through flanges 18 on the sleeves. Each flange 18 is secured in a recess 19 in one side of the case. Each sleeve 15 is provided at its inner end with a bearing 20 and at its outer end, with a roller bearing 21. Sleeves 15 are supported on axles $c'$ respectively, which rotate in bearings 21. The outer end of each axle is sustained in the hub $F'$ of one of the traction wheels F.

The differential gearing $c$ for driving the axles, comprises a drum 25 formed with an integral flange 26 for attachment of a gear ring 27 by which the differential gearing will be driven. Drum 25 has sides 28, each of which has a hub 29 journaled in one of the bearings 20 on the sleeves 15. Bolts 30 secure the members of the drum together. Radial arbors 31 are mounted in drum 25 and beveled pinions 33 on said arbors mesh with the beveled gears $c^2$ which are fixed on the axles $c'$ respectively.

Each traction wheel is driven from one of the axles $c'$ by an inclosed planetary reducing gearing. Each planetary gearing comprises a pinion $g$ fixed on an axle $c'$. A series of planetary pinions $g'$, mounted on studs $g^2$ which are carried by a flange $f^*$ formed on the hub $F'$ of the traction wheel, mesh with a pinion $g$, and an internally toothed gear-ring $g^3$ which is fixed in a housing $g^4$ formed on the outer end of a sleeve 15, is engaged by the planetary pinions $g'$. A flange $f^2$ on each hub $F'$ is extended laterally and inwardly around the housing $g^4$, as at $f^3$, and contains a packing ring or packing $f^4$ to exclude dust from the reducing gearing. A nut and washer $f^5$ hold each traction wheel on its axle. In operation, each shaft $c'$ will operate its pinion $g$, which meshes with the planetary pinions $g'$ and the latter will travel around, as a result of meshing with the gearing ring $g^3$ and materially reduce the speed between the axle and the traction wheel. This construction exemplifies one in which housed planetary reducing gearing between the traction wheel and the differential is utilized to drive the traction wheels. This construction also exemplifies one in which an exposed pinion on the drive shaft and an exposed gear ring on the traction wheel are avoided and one in which the differential gearing is mounted co-axially with the traction wheels and in which the latter are driven at a reduced speed from the differential gearing and by axles.

Drive shaft $b$ is parallel to the axles $c'$ and is journaled in bearings 35 and 35'. Bearing 35 is carried by a head 38 which is removably secured by bolts 39 to one side of the case $a$. Bearing 35′ is held in a head 37 which is removably secured by bolts 37′ to the other side of the case $a$. A service pulley (not shown) for driving any mechanism other than the traction wheels, is usually fixed on the outer end of shaft $b$.

A longitudinal shaft 41, usually coaxial with the motor-shaft and driven from the motor through a suitable clutch, is mounted in a bearing 42 which is held in the front end of the case $a$. A thrust bearing 43 is provided for shaft 41 in a removable cap 44 which contains packing for excluding dust from the case $a$. A beveled pinion 46 is fixed to the inner end of shaft 41 and constantly meshes with a beveled gear 47 which is fixed to the transverse drive shaft $b$. Beveled gears 46 and 47 serve to impart constant rotation to the drive-shaft $b$.

The invention contemplates mechanism by which the traction wheels may be driven from shaft $b$, forward at high, low or intermediate speed and in reverse direction at one speed. A high-speed pinion 49, a low-speed pinion 50, and an intermediate-speed pinion 48 are slidably mounted and separately movable on the drive-shaft $b$, the latter being provided with keys to drive the low-speed and intermediate pinions. The high-speed pinion 49 is adapted to be driven directly from the beveled gear 47 by clutch-teeth 49′ between said pinion and said gear. A transverse shaft 54, parallel to and between the shaft $b$ and the axles $c'$, is mounted in a bearing 54′ in head 38 and a bearing $54^a$ in one side of the casing $a$. A gear wheel 52′ fixed to drive and rotate shaft 54 meshes with the high speed drive pinion 49. Integral intermediate gears 52 and 53 are mounted in the case and on the shaft 54 and rotate therewith. The low-speed pinion 50 is adapted to be shifted into engagement with the gear 53 and the intermediate-speed pinion 48 is adapted to be shifted into engagement with the gear 52 which is smaller in diameter than the gear 53. Gear 52 meshes with the gear ring 27 which is mounted on and drives the differential gear-drum 25. When the pinions 49, 50 and 48 are in neutral position, as shown in Fig. 1, the pinion 49, shaft 54 and the gears thereon will all be idle so that there will be no unnecessary wear upon these parts. A shaft 60, (Figs. 3 and 8) which is parallel to the drive shaft $b$, is mounted in the heads 37 and 38 of the case $a$, and integral reverse pinions 61, 62 are slidably mounted on said shaft. Pinion 61 is adapted to mesh with the gear 52 and pinion 62 is adapted to be shifted into mesh with the intermediate-speed pinion 48. Normally, reverse pinions 61 and 62 are idle and when they are conjointly shifted laterally, gear 62 will pass into engagement with the constantly rotating intermediate speed pinion 48 and pinion 61 will pass into engagement with the gear 52. The movement to render the reverse gearing operative is less than the width of either of said pinions and the clearance between the pinions 48 and 62 is less than between the gear 52 and pinion 51, to cause pinion 62, which is normally idle, to engage constantly rotating pinion 48 and commence rotation before the pinion 61 engages the gear 52.

The mechanism for controlling the variable speed transmission-gearing (Figs. 3, 4 and 5) comprises an arm 63 provided with a fork fitting into a groove in the hub of high speed pinion 49; an arm 65 provided with a fork fitting in a groove in the hub of the low-speed pinion 50, an arm 66 provided with a fork fitting into a groove on the hub of the intermediate-speed pinion 48; and an arm 67 with a fork fitting between the integral reverse-pinions 61, 62. All of the arms 65, 66 and 67 have hubs which are slidable on a transverse guide-shaft 69 which is mounted in the case $a$. Arm 63 has its hub fixed to a slidable stub-shaft $67^a$. Arms 65, 66 and 67 are formed respectively with grooved lugs 71, 71′ and 72 which are relatively offset or disposed laterally of one another so any one may be shifted longitudinally of the shaft 69, independently of the other. A grooved lug 70 is fixed to the inner end of shaft $67^a$ and is extended into position at one side of the lug 72. These grooved lugs are formed with suitable lugs $65^a$ for sliding engagement and mutual guidance. When the gearing is in neutral position, the grooves in lugs 70, 71, 71′ and 72 are alined so that a shifter arm 74 may be moved laterally into interfitting relation with either of the grooved lugs. Arm 74 is secured to a slidable rock-shaft 75 which is mounted in a housing $a^{11}$ secured on top of the case $a$. Shaft 75 is slidable in said housing so that the lower end of arm 74 may be shifted into either of the grooved lugs 70, 71, 71′, and 72 to bring said end into operative or engaging relation with either of said lugs. A hand wheel 75′ is secured to said shaft, to turn the shaft and to operate it longitudinally. A slotted plate 77 is secured between the casing $a$ and housing $a^{11}$ and the lower end of arm 74 works through a slot in said plate. This slot comprises a central longitudinal portion 78 which permits the longitudinal movement of the shaft when the arm is in its central position and communicating cross-slots 79, 80, 80′ and 81, which permit the arm to be rocked only when it is in correct position to shift one of the pinion-shifting arms. This necessitates shift of the lever 74 to its centralized or neutral position and shift of all of the pinions to neutral position before arm 74 can be shifted from one shifter arm to another. A double locking arm 82 is mounted on controller shaft 75 and its terminals 83 are formed to slide in longitudinal slot 78 in plate 77 and in the grooves in lugs 70, 71, 71' and 72 on the shifter arms respectively, so that all of the shifter-arms, except the one engaged by the arm 74 will be locked against transverse movement. Slot 78 limits the longitudinal movement of the controller arm 74, and the members 83 of the double locking arm 82. This controlling mechanism exemplifies a construction in which a wheel or like element on a longitudinally movable and rocking shaft may be used to effect all of the gear changes.

The operation of the gearing will be as follows: Assuming the controller shaft to be in normal position and the gearing neutral, the grooved lugs on the controller arms will be alined as shown in Fig. 7 and shaft b will be operated from the motor. For low speed operation, shaft 75 will be rocked so that the lower end of arm 74 will pass into slot 79 to operate shifter arm 65 to shift the revolving low-speed pinion 50 into mesh with gear 53 so that gear 52 will drive the gear ring 27 and the differential gearing at low speed. For the intermediate speed, shaft 75 will be shifted longitudinally into position for arm 74 to enter slot 80 and then rocked from its neutral position so that its lower end, which will then be in the grooved lug 71', will operate shifter-arm 66 and shift the intermediate-speed pinion 48 into engagement with the gear 52 so that the gear-ring 27 and the differential gearing will be driven at intermediate speed. For high-speed operation, arm 74 will be shifted longitudinally until it can pass into slot 80' and then rocked to cause said arm to engage the grooved lug 70 and shift the arm 63 into position to bring pinion 49 into clutched relation with gear 47, whereupon, pinion 49 will drive gear 52', shaft 54, and gear wheel 52 which will drive the gear ring 27 of the differential gearing. To reverse the direction of travel of the tractor, shaft 75 will be shifted longitudinally until the shifter arm can pass into slot 81. Shaft 75 will then be rocked to operate arm 74 to shift the reverse shifter arm 67 into position to initially bring gear 62 into engagement with intermediate speed-pinion 48 and to then bring pinion 61 into engagement with gear 52. Thereupon, the direction of rotation of the intermediate gearing and the differential will be reversed. When either of the controller arms is in position to render one of the drive pinions operative, the other arms will be locked against movement by the members 83 of the double rocking arm 82. To prevent the controlling devices from being jarred out of position, an arm 90 is secured to shaft 75 so it will move longitudinally and be rocked therewith. This arm has a segmental face 91 having recesses 92 therein which are positioned to receive a ball 93 which is constantly pressed toward said face by a spring 94, when the controller shaft is positioned to render either the low, high, intermediate or reverse gears operative. The device yieldingly holds the controlling mechanism so it can be manually shifted at any time.

The invention exemplifies a combined differential and variable speed transmission gearing which is simple in construction and which makes provision for high, low and intermediate speeds.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In transmission gearing, the combination of a case, differential gearing in the case, a transverse drive-shaft mounted in the case, a longitudinal shaft connected to drive the transverse drive-shaft, an external gear on and for driving the differential gearing, an intermediate transverse shaft mounted in the case, a gear on the intermediate shaft constantly meshing with the gear on the differential, and gearing between said shafts for driving the gear on the intermediate shaft at high, low and intermediate speeds in one direction and inclosed in the case the driving connection between said longitudinal and transverse drive-shaft and said gearing comprising a plurality of pinions, one of which is slidably mounted on the hub of said fixed gear and adapted to be driven thereby.

2. In transmission gearing, the combination of a case, differential gearing in the case, a transverse-shaft mounted in the case, a longitudinal shaft connected to drive the transverse drive-shaft, an external gear on and for driving the differential gearing, an intermediate transverse shaft mounted in the case a gear on the intermediate shaft constantly meshing with the gear on the differential, and gearing between said shafts for driving the gear on the intermediate shafts at high, low and intermediate speeds in one direction and at one speed in reverse direction and inclosed in the case the driving connection between said longitudinal and transverse drive-shaft and said gearing comprising a plurality of pinions, one of which is slidably mounted on the hub of said fixed gear and adapted to be driven thereby.

3. In transmission gearing, the combination of a case, differential gearing in the case, a transverse drive-shaft in the case, an external gear on and for driving the differential gearing, an intermediate transverse shaft, a gear on the transverse shaft constantly meshing with the gear on the differential, and high, low and intermediate speed pinions, all mounted on the drive shaft and inclosed in the case, one of said pinions being movable to engage the gear on the intermediate shaft which meshes with the gear on the differential.

4. In transmission gearing, the combination of a case, differential gearing in the case, a transverse drive shaft in the case, an external gear on and for driving the differential gearing and intermediate transverse shaft, a gear on the transverse shaft constantly meshing with the gear on the differential, high, low and intermediate speed pinions all mounted on the drive shaft and inclosed in the case, one of said pinions being movable to engage the gear on the intermediate shaft which meshes with the gear on the differential, and reverse gearing comprising a pinion adapted to mesh with the gear on the intermediate shaft.

5. In transmission gearing, the combination of a case, differential gearing in the case, a transverse drive-shaft in the case, an external gear on and for driving the differential gearing, an intermediate transverse shaft, a gear on the transverse shaft constantly meshing with the gear on the differential, high, low and intermediate speed pinions all mounted on the drive shaft and inclosed in the case, one of said pinions being movable to engage the gear on the intermediate shaft which meshes with the gear on the differential, and reverse gears between said shafts, one of which is movable into mesh with one of the pinions on the drive-shaft and the other into mesh with the gear on the intermediate shaft.

JOHN B. FOOTE.